United States Patent [19]

Singfield

[11] Patent Number: 4,571,484

[45] Date of Patent: Feb. 18, 1986

[54] MECHANISMS TO HEAT FLUIDS TO HIGHER TEMPERATURES AND PRESSURES

[75] Inventor: Peter Singfield, South Stukely, Canada

[73] Assignee: Dicore Resources, Ltd., Calgary, Canada

[21] Appl. No.: 585,522

[22] Filed: Mar. 2, 1984

Related U.S. Application Data

[63] Continuation of Ser. No. 332,315, Dec. 18, 1981, which is a continuation of Ser. No. 136,116, Mar. 27, 1980, abandoned.

[30] Foreign Application Priority Data

Apr. 2, 1979 [CA] Canada ................................. 324594

[51] Int. Cl.⁴ ............................ F22B 1/06; F24H 7/02
[52] U.S. Cl. .................................... 219/271; 219/378; 219/325; 219/273; 122/40; 165/104.17
[58] Field of Search ............... 367/142, 146; 181/106, 181/110, 113, 115, 120, 118, 119; 219/326, 271, 272, 273, 275, 276, 325, 378; 165/104.17, 104.22, 104.23; 122/32, 33, 40; 251/14, 15, 129, 138

[56] References Cited

U.S. PATENT DOCUMENTS

| | | | |
|---|---|---|---|
| 909,896 | 1/1909 | Hertzberg | 219/273 |
| 1,475,589 | 11/1923 | Marden | 219/273 |
| 2,048,104 | 7/1936 | Clinefelter | 219/326 |
| 2,066,127 | 12/1936 | Slayter | 219/275 |
| 2,244,180 | 6/1941 | Williams | 219/273 |
| 3,029,596 | 4/1962 | Hanold | 165/104.17 |
| 3,289,743 | 12/1966 | Biro | 165/104.17 |
| 3,410,986 | 11/1968 | Groom | 219/275 |
| 3,419,666 | 12/1968 | Groom | 219/273 |
| 3,576,424 | 4/1971 | Strapp | 219/325 |
| 3,722,445 | 3/1973 | Karig | 219/378 |
| 4,015,684 | 4/1977 | Pauletich | 219/271 |
| 4,203,026 | 5/1980 | Walter | 219/273 |

FOREIGN PATENT DOCUMENTS

480560 2/1938 United Kingdom ............... 219/530

*Primary Examiner*—C. L. Albritton
*Assistant Examiner*—Teresa J. Walberg
*Attorney, Agent, or Firm*—Cushman, Darby & Cushman

[57] ABSTRACT

Devices and methods are provided for generating a high pressure gas such as steam utilizing as a heat source the heat released by the change of state of a material, e.g. the heat of fusion released by solidification of a liquid metal. One such device generates steam in a continuous manner, while another such device generates steam in intermediate bursts. Also provided is a method for generating sonic waves underwater for seismic exploration. These sonic waves are generated from bursts of steam produced from the above-mentioned steam generating device which generates intermediate bursts of steam.

22 Claims, 6 Drawing Figures

MECHANISMS TO HEAT FLUIDS TO HIGHER TEMPERATURES AND PRESSURES

CROSS-REFERENCE TO RELATED APPLICATIONS

This is a continuation of copending application Ser. No. 332,315 filed Dec. 18, 1981 which in turn is a continuation of application Ser. No. 136,116 filed Mar. 27, 1980, now abandoned.

The present invention relates to a device and a method for generating a high pressure gas, as well as a device for generating sonic waves for underwater seismic explorations.

Today, one of the most familiar sound sources used in seismic surveying is the compressed air gun. Such a gun is presently supplied in its many variations by Bolt Associates, Canadian Patent Nos. 923,611 and 943,227. These sound sources work on the principle of quick controlled release of high pressure air in exact timed intervals. The high energy sound source is produced by a rapidly expanding air bubble. There are, however, a few problems with this system.

The first is commonly known as the bubble effect where the air bubble expands past its stabilization point, finally slowing then being forced back by water pressure down past its stabilization point. This bouncing effect sets up an extremely undesirable pattern of secondary sound sources that make it very difficult to get clean seismic data from surveying equipment. Many have been the inventions trying to stop this effect.

There have been different systems (Canadian Patent Nos. 983,615 and 923,611) proposed to stop this effect by injecting into said air bubble an extra amount of air just as the bubble passes its stabilization point. This tends to moderate the bubble effect for a short period of time lessening the intensity of secondary sound waves thereby increasing the ratio of sound power between first pulse and secondary pulses.

Today, seismic survey companies are already quite concerned over the cost and complexity factors involved with supplying the large amounts of compressed air needed to furnish the normal systems. These systems release in the neighborhood of 1 cu. ft. of air compressed to 2000 or over lbs./in. sq. every 6 to 10 seconds for extended periods such as 72 hrs. nonstop. Now seismic firms realize that eventually these requirements must be increased quite substantially in order to prospect in more adverse conditions. Preferably they would rather not expand extra air for bubble effect supression.

At present, a system is in operation called the tuned gun array (Canadian Patent No. 868,502). In brief, this system works by releasing many different sizes of air bubbles as instantaneously as possible on the assumption that the primary signal will be full strength, whereby secondary signals, though in existence, will be out of tune with each other since different size bubbles oscillate at different rates. Thus this system does not eliminate the effect but does manage to increase the sound force ratio between primary and secondary sound signals. Theoretically the ratio reached should be much higher for optimum performance. To make up for this lack, again, greater amounts of expensive compressed air are required. Also this system requires a multiplicity of an already complicated release mechanism. At present 32 such guns must be fired simultaneously to create this effect. This means an incredible increase in capital investment for machineries and the lines to supply air and electronic controls becomes exotic indeed.

A company from France, Canadian Patent No. 953,015, investigated the production of sound waves for seismic prospecting using the principle of implosion. Further, a second company from France, Canadian Patent No. 914,517, creates this same type of implosion effect by using heated vapor under pressure, this vapor being steam. It has been discovered that creating sound waves by implosion does not set up secondary sound sources and very high ratios of first signal to interference noise are therefore established.

As mentioned in Canadian Patent No. 914,517, the vapor gun operates on this principle. Steam, at previously determined pressure and temperature, is released, under controlled valving conditions, into the ocean waters, at a depth, creating a large vapor bubble. This bubble condenses at an extremely rapid rate from the outside circumference towards the center. The water follows this path creating a sonic shock wave when it meets in the center. Using this system one vapor gun can duplicate the effects of a tuned array of thirty-two guns. However, the chilling effects of frigid ocean water makes the delivery of steam to the vapor gun a tremendous problem at greater depths. In the field of seismic exploration a need is beginning to be felt to create sound shocks at ever increasing depths. Also, theoretically, the vapor bubble implosion will occur with greater intensity at greater depths due to the higher pressure of the surrounding liquid medium and the cooler temperature of this same medium. Shipboard generation of steam thereby becomes increasingly impractical. Accordingly, there is a need in the art to develop improved seismic techniques for under water exploration with respect to conventional compressed air gun systems, tuned gun array systems and vapor bubble systems.

SUMMARY OF THE INVENTION

The present invention involves a device and a method for generating a high pressure gas, as well as a device for generating sonic waves for underwater seismic explorations. In principle, the invention involves the transfer of heat to a gas or a gas forming substance (e.g., a vaporizable liquid), said heat being released by the change of state of a material (e.g., the solidification of a liquid metal).

In the field of seismic exploration under water many advantages of the sound impulse generation method, described herein, result from an abrupt and clear sound impulse which is produced by remote control using variable power settings in a readily repeatable cycle. These powerful sound impulses are useful for seismic exploration. This sound impulse generator operates for long period of time, continuously producing powerful sound impulses at frequent timed intervals.

The present invention is illustratively described as a device capable of creating large amounts of accoustical energy in water in the form of a clear repeatable pulse, the frequency and amplitude of which may be readily varied. These pulses are ideal for use in seismic exploration systems and can also be used to advantage for other purposes.

Among many objects of the present invention is to create accoustical repetition whereby large amounts of sound energy is produced with a relatively small device. Also, said device is convenient and safe to use for a wide variety of functions. Forthwith the term, vapor gun, is intended to include powerful impulse devices which are operated with liquids supplied under pressure to a compact high intensity electric vapor generator. Mostly, however, the liquid used is water, but it is to be understood that the term, vapor gun, is not intended to be limited to water vapor alone.

For the purposes of this description liquid metal shall mean metals such as sodium, aluminum, alloys of aluminum. Also the fluid heated to vapor shall be water. But it should be clear that other metals in the bath can and may be used. Also other fluids besides water for totally different applications may be used. The invention is not limited to any specific metal for the bath or any specific fluid to generate vapor.

DETAILED DESCRIPTION OF THE DRAWINGS

Figure 1:
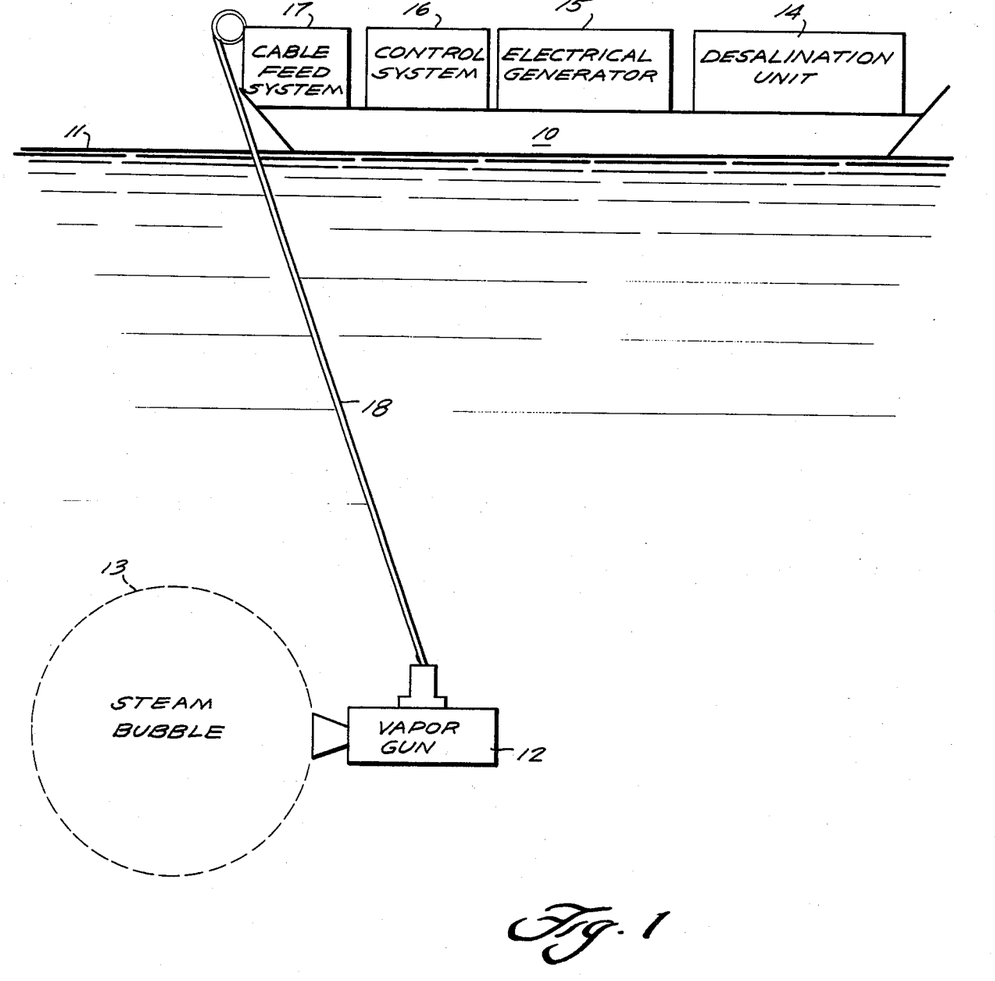
FIG. 1 is a block diagram of one embodiment of the invention as applied to seismic exploration.

Referring to FIG. 1, a floating vessel 10 from which seismic exploration may take place is shown on the surface 11 of a body of water. This exploration is facilitated by vapor gun 12 which, according to one aspect of the invention, may generate vapor bubble 13. Demineralized water for the vapor gun 12 is furnished from desalination unit 14, while electrical power for the vapor gun 12 is supplied by high power electrical generator 15. Control system 16 for electrically firing vapor gun 12 also controls the amount and pressure of the demineralized water supplied to the vapor gun 12.

The vapor gun 12 may be raised and lowered from the ship to various depths by cable feed system 17. The vapor gun 12 is thus suspended by trunk line 18 which includes two large electric lines plus a water feed tube and a solenoid activation wire.

Figure 2:
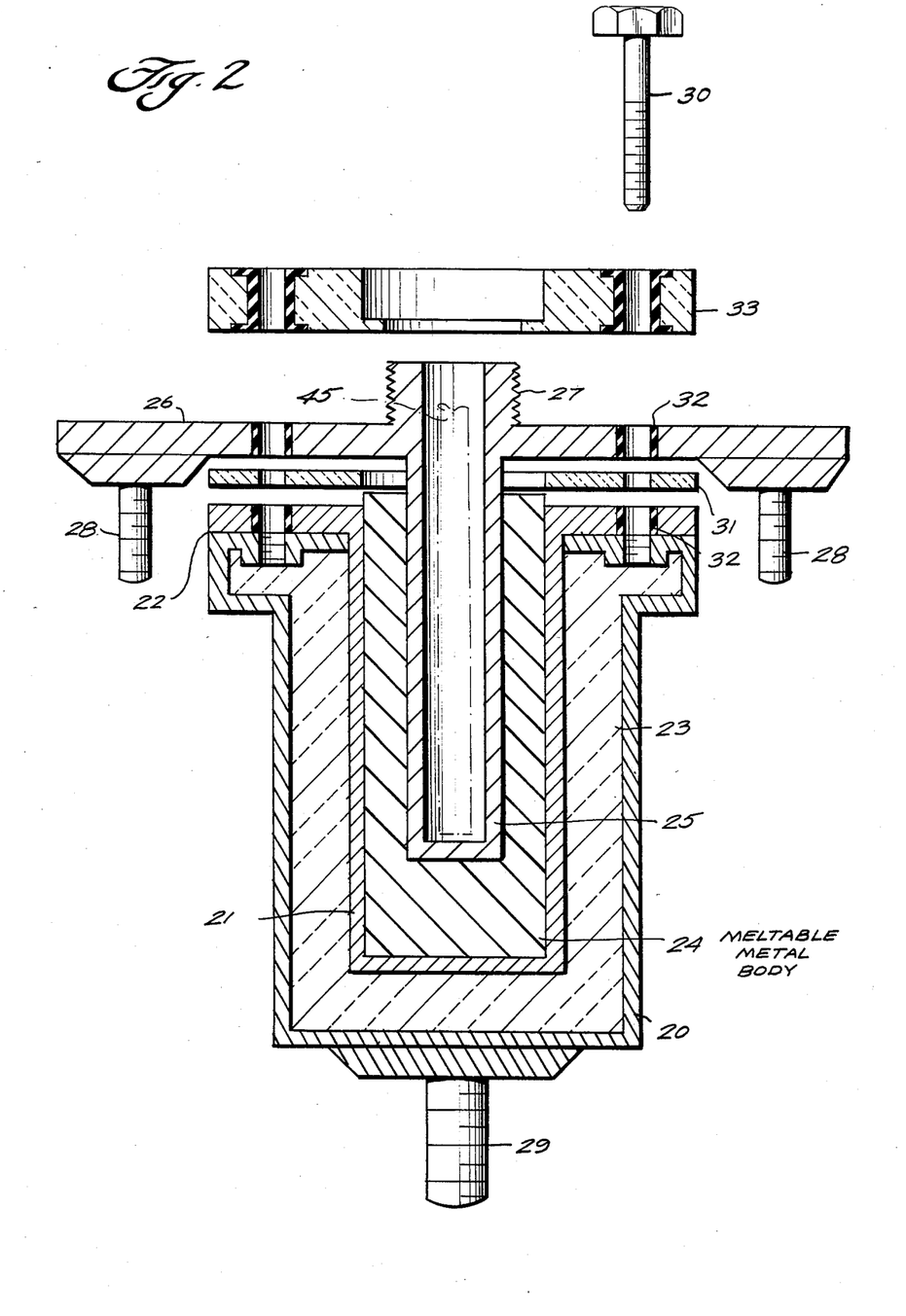
FIG. 2 is an exploded cutaway diagram of a high intensity liquid metal bath boiler.

FIG. 2 illustrates an exploded cutaway diagram of a high intensity liquid metal bath boiler. The boiler unit is basically an insulated container having an outer shell 20 fabricated of a tough, low resistance metal, such as copper. This outer shell is in electrical contact with liquid metal bath container 21 through junction 22. This liquid metal bath container 21 may be made of a material of high temperature capabilities such as S.A.-213-TP-304H-18Cr-8Ni. The space between the outer shell 20 and the liquid metal bath container 21 is filled with an insulant 23 such as asbestos fiber.

Liquid metal bath container 21 is in electrical contact with medium resistance metal 24 which is in turn in electrical contact with the boiler tube portion 25 of cap structure 26. Thus, in operation the cavity between the metal bath container 21 and the boiler tube 25 is filled with a machined plug of a medium resistance metal 24 of previously established melting point. Upon completion of an electrical circuit through this plug, heat is generated which eventually melts this metal to create the desired liquid metal bath. Metals used may range from sodium to aluminum and certain alloys of either of these or any other metals.

The cap 26 is formed from a material of high temperature capabilities and may be formed from the same material as used for the liquid metal bath container 21. In addition to boiler tube 25, cap 26 also comprises a threaded adapter 27 and electrical terminals 28. Threaded adapter 27 is an extension on cap 26 from the boiler tube 25 which allows attachment of different mechanisms that control the operation of the boiler. Elecrical contacts between terminals 28 and another terminal 29 on outer shell 20 permit an elecrical circuit to flow through and melt metal 24.

A means for securing the boiler assembly is represented by bolt 30, which is one of several bolts which may be used to lock the cap 26 to the metal bath container 21 and the outer shell 20. Gasket 31 is an insulant of very high electric and thermal resistance such as asbestos sheeting. Bushings 32 prevent short circuiting of the electrical current through bolt 30 between cap 26 and metal bath container 21. Thermally resistant collar 33 fits over the top of the cap 26 to impede the loss of heat from liquid metal bath 24. Asbestos would be such a material as is used here.

Figure 3:
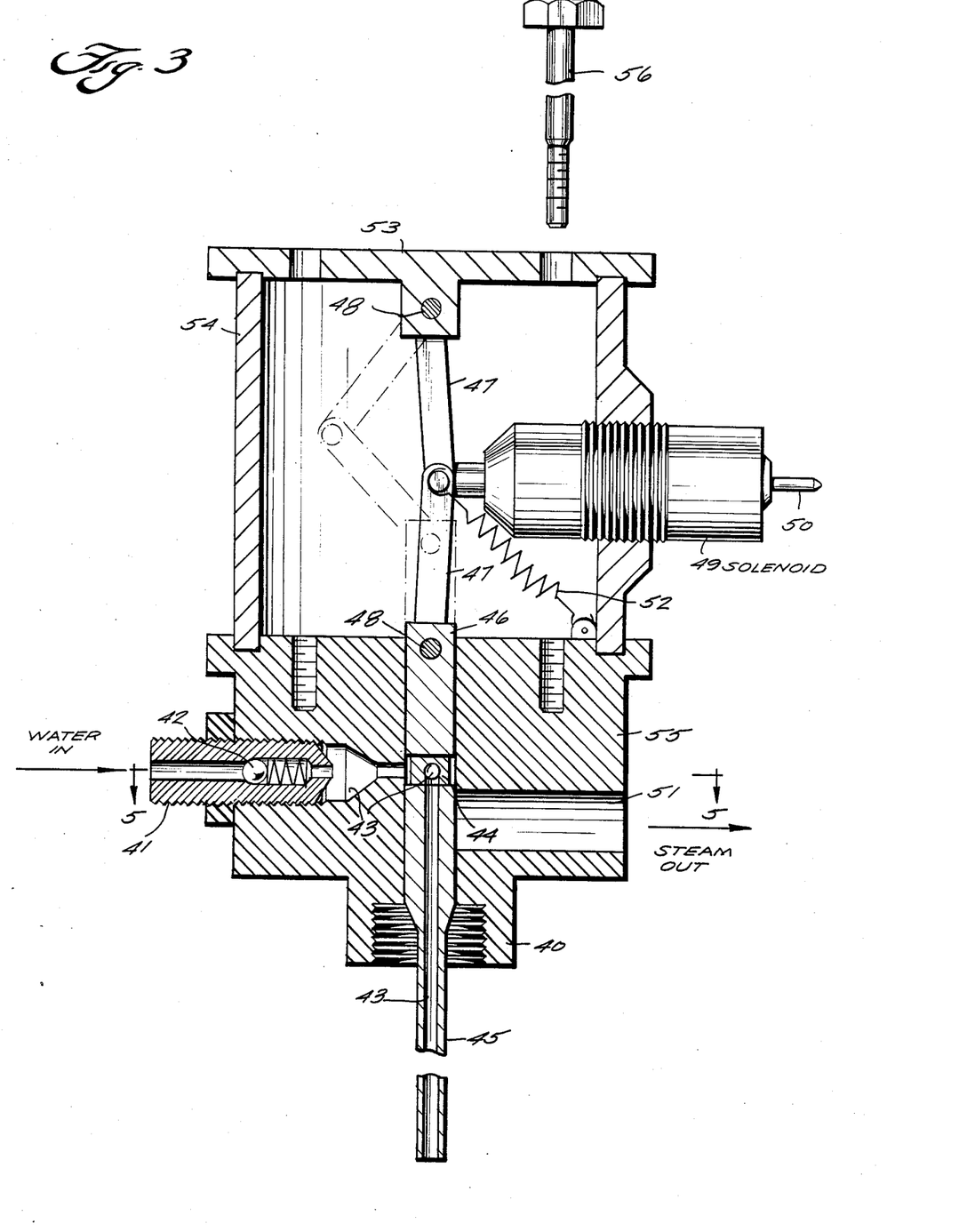
FIG. 3 is a cutaway diagram of a quick release valving mechanism that allows this invention to fulfill its objective as a sound impulse generator.

FIG. 3 illustrates a quick release valving mechanism that allows the boiler of the present invention to fulfill its objective as a sound impulse generator. Threaded flange 40 of FIG. 3 allows mounting of the quick release valve to the threaded adapter 27 of the boiler unit of FIG. 2. Threaded nipple 41 of FIG. 3 allows the connection of a high pressure water line to the valve. In operation water from this high pressure line may flow through one way valve 42 through passage 43 in order to be injected into the boiler. Thus, spacer 44 contains holes to permit the flow of water into water feed tube 45 when piston 46 is in the position shown in FIG. 3. As shown in FIG. 3, piston 46, spacer 44 and water feed tube 45 are adhered together so as to form an integral assembly. Piston 46 is also attached to two flex arms 47 supported on three bearing points 48.

The release valve mechanism is activated by electrical solenoid 49 having attached thereto electrical terminal 50. After a release of a pulse of steam through exhaust port 51, spring 52 supplies energy to return piston 46 to the closed position shown.

As shown in FIG. 3, the upper assembly includes upper cap 53, side wall member 54 (e.g., tubing) and the body portion 55 surrounding the the piston valve. These components are held together by means of bolts, one of which is shown as bolt 56.

Figure 4:
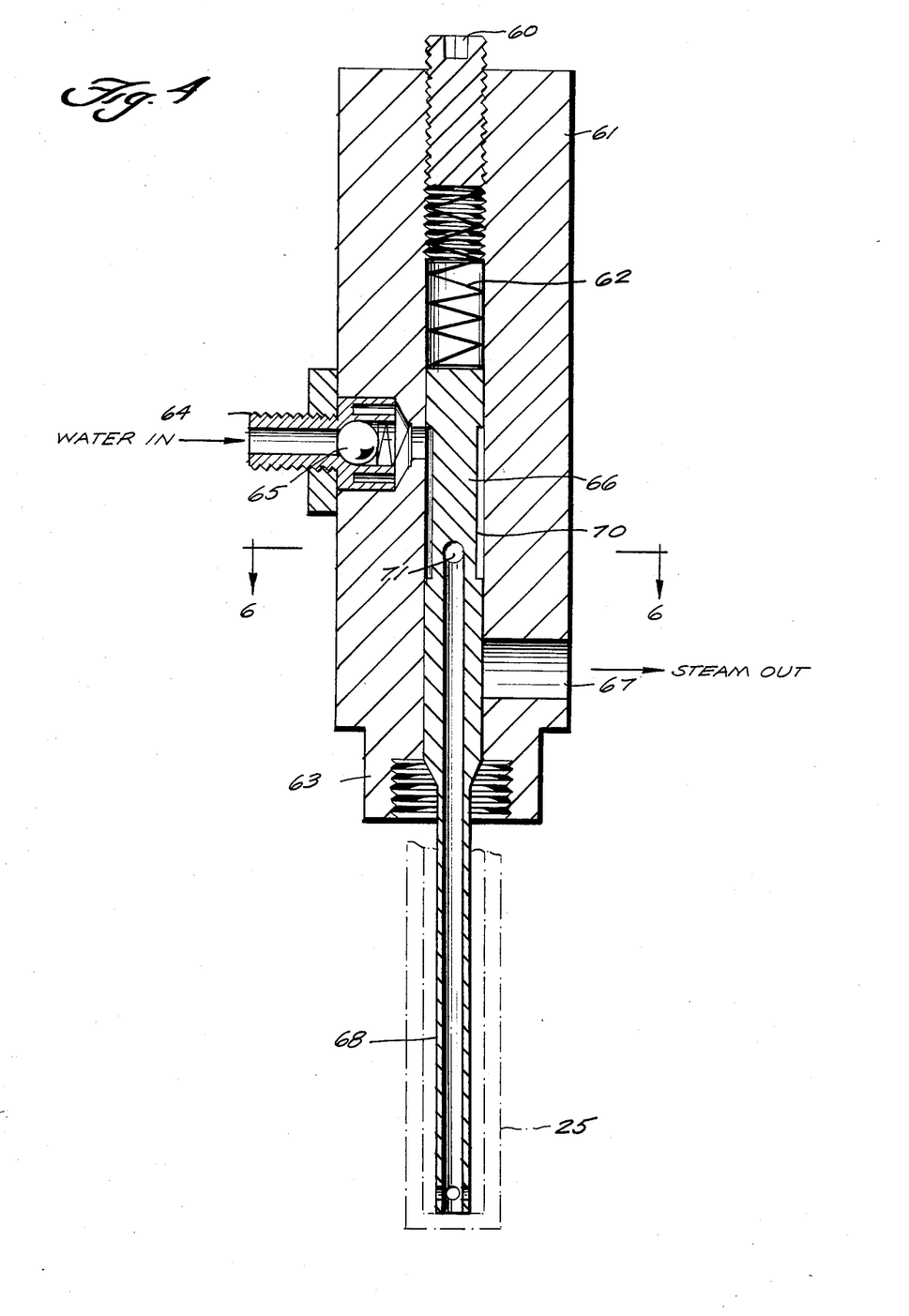
FIG. 4 is a cutaway view of a valving mechanism that allows this invention to perform other of its emobidments in relation to being a compact source of continuous high pressure steam.
Figure 5:
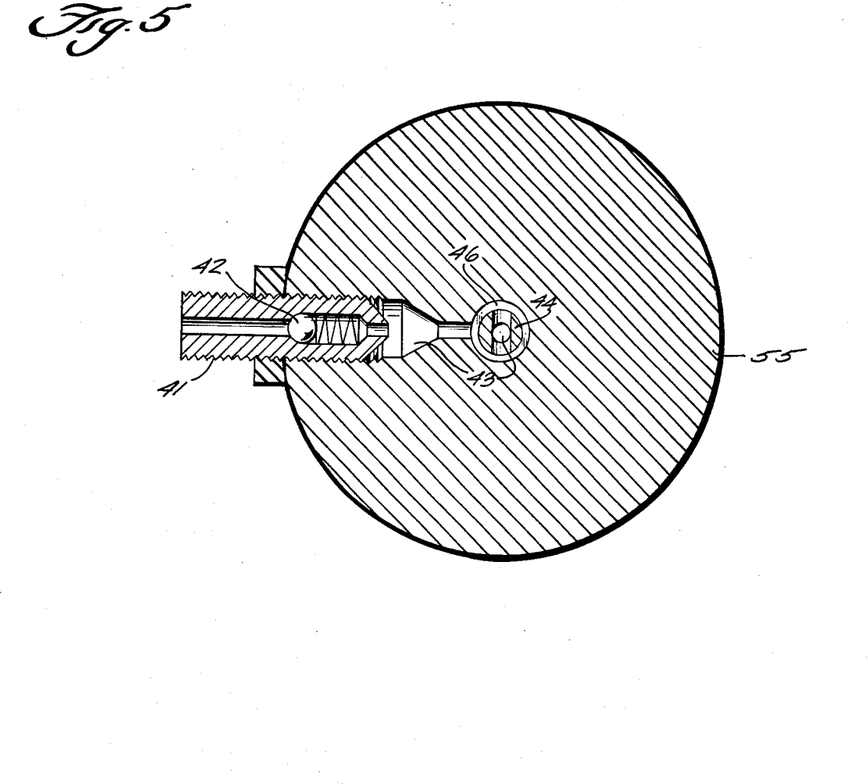
FIG. 5 is a horizontal sectional view through line 5—5 of FIG. 3.
Figure 6:
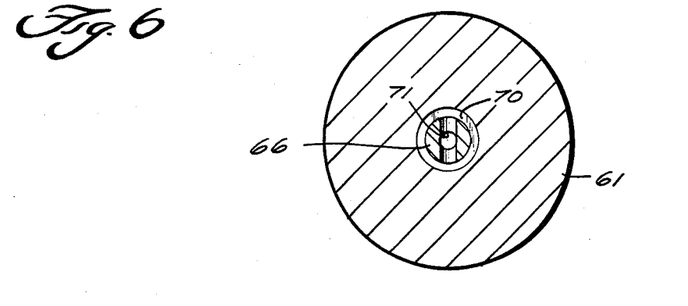
FIG. 6 is a horizontal sectional view through line 6—6 of FIG. 4.

FIG. 4 shows a cutaway view of a valving mechanism that allows the present invention to perform another of its embodiments in relation to being a compact source of continuous high pressure steam. Allen key stud 60 in connection with valve body 61 is used for adjusting the compression of the valve piston spring 62. Threaded flange 63 allows mounting to the threaded adapter 27 of the boiler unit of FIG. 2. Threaded nipple 64 of FIG. 4 allows coupling with a water source. Other features of the valve mechanism of FIG. 4 include one way valve 65, piston valve 66, steam exhaust port 67 and water feed tube 68.

The embodiments of FIGS. 2, 3 and 4 may now be described more fully with respect to their assembly and operation. According to FIG. 2, the boiler unit is basically an insulated container 20,21,23 isolated by a gasket 31 from the boiler tube assembly called a cap 26. A piece of metal 24, chill cast to the exact internal measurements of the space between cap 26 and outer shell 20, is inserted into this space. The boiler cap 26 is then fitted, boiler tube 25 fitting within the cavity of cast piece of bath metal 24. Bolts (represented by bolt 30) are inserted through insulating collar 33 and the unit is bolted together. Electric leads are attached to terminals 28 and 29.

At this point, valving mechanism is chosen. The first example shall be FIG. 3 which is a very fast relief valve with spring bias return action The valve illustrated in FIG. 3 is threaded by flange 40 to boiler collar 27. Water delivery tube 45 in FIG. 3 stops within a distance equal to its internal passage diameter from the bottom of boiler tube 25 in FIG. 2. Then a solenoid actuating line is attached at 50 in FIG. 3 and a water line is attched to nipple 64 in FIG. 3. Now the unit is lowered into the ocean depths. Current is supplied to boiler unit melting liquid metal bath. Previous experimentation allows the operator to know what time period is required for initial melting of a cold metal bath. When metal is melted a metered amount of pure water is injected through one way valve 42 in FIG. 3 into valve body 55 in FIG. 3. The water is metered by an injection system on board ship basically the same way fuel is metered to a deisel motor. Water under pressure in valve body 55 of FIG. 3 follows a passageway to the assembly of piston 46, spacer 44 and water delivery tube 45. This assembly at this point in its action, as shown in FIG. 3, presents to said channel a relief channel cut into its outer circumference of its body as depicted by spacer 44. This channel allows water to reach a hole (43 in FIG. 3) which leads to water delivery tube (45 in FIG. 3) which extends almost to the bottom of boiler tube 25 in FIG. 2. As the water passes through this internal tube it begins picking up heat. When it reaches the bottom of the delivery tube it is already boiling. The supersaturated steam, with water drops thus formed, is then further forced into the channel existing between water tube delivery and boiler tube. Here extreme heat is applied to vapor raising temperatures extremely rapidly. This rise is transferred back to the central delivery tube further increasing the temperature of delivery water inside of the central tube.

This extreme rise in temperature also causes a high rate of increase in pressure. When the pressure of the boiler exceeds the water delivery pressure level, one way valve 42 in FIG. 3 closes effectively isolating the boiler. Since electrical current is still being supplied to the metal bath and the metal bath still is releasing large amount of stored heat, temperature and pressure quickly mount. At a predetermined time setting, solenoid 49 in FIG. 3 is activated, releasing piston 46 to travel upwards exposing port 51 thereby releasing a pulse of very high pressure steam into the immediate surrounding medium. Preferably, time factors involved should be 6 to 10 seconds per cycle.

That means valve has just been closed by return spring 52 in FIG. 3 at time 0. At this time liquid metal bath 24 of FIG. 2 has almost solidified. Current entering at great rate liquefies this metal in say 3 seconds. Water is injected at beginning of 4th second. Water absorbs stored heat and direct heat for a further 3 seconds. On the 6th second solenoid activates. Within milliseconds piston valve 46 in FIG. 3 opens releasing steam and then closes to repeat the cycle.

The pressure and characteristics of steam produced are directly controlled by:

(1) How much water is metered to boiler.
(2) How much current is supplied to bath.
(3) How much time is allowed for cycle.

Looking more closely at FIG. 3 for a valve actuating method, piston travel is controlled by a flex arm actuating system. As shown in FIG. 3, exhaust port 51 is blocked by a piston valve. The two flex arms 47 are supported on three bearings 48. One bearing mounts to cap 53, another to the top of piston 46 and the final bearing joins both arms together directly opposite the actuating pin of solenoid 49. It is simple to see that center bearing 48 is canted off center against solenoid 49. In this position pressure would have to overcome and bend arms 47 in order to raise piston 46. This cannot do since arms 47 are designed to take much higher forces of pressure than the boiler operates at. However, upon activating solenoid 49, center bearing 48 is pushed through said center line. Once it reaches past the center point opposite the solenoid nothing is left as resistant to further movement except tension spring 52 which is not at all equal to the task of stopping this motion. Piston 46 is thereby free to travel upward such that the tapered portion of water feed tube 45 clears exhaust port 51. Upon clearing port 51, pressure to continue upward travel of piston 46 is drastically reduced and the resistance of spring 52 serves to restrict further upward movement. Once the pulse of steam has exited and internal boiler pressure has dropped sufficiently low, spring 52 serves to pull flex arm 47 back into position against solenoid 49 since deactivated. Solenoid 49 is threaded through body 54 enabling adjustment of travel required for center bearing 48 to pass through the center and thereby release. This mechanism thereby serves its purpose to quickly release boiler pressures and automatically close once pressures have been drastically lowered. A further possible use of this valve would be as a safety release valve for present day commercial boilers or compressed air systems.

The continuous single pass high pressure steam generating head of FIG. 4 is a further attachment to the invention which supplies a means for continuous generation of high pressure steam. Assembly to boiler is through threaded flange 63 as in the quick release valve previously described. A water delivery line is attached to nipple 64. Delivery to boiler is basically as in the quick release valve excepting that the relief area machined into piston body is long enough to still allow water to pass even after piston has moved to open exhaust port 67. Spring 62 has its compression tension adjusted by stud 60 and delivery tube 68 rests flush, with compression, against bottom of boiler tube 25 in FIG. 2. Four holes near bottom of delivery tube 68 assure delivery of water to boiler in start up position.

As in the previous description, the metal bath boiler is set in operation by the application of an electrical current. When boiler has reached operating conditions a continuous high pressure flow of water is supplied to nipple 64. This water finds its way through relief area and hole 71 to the boiler and is flashed into steam. When the pressure of steam has reached a point high enough to overcome the resistance of spring 62, piston 66 starts an upward movement uncovering exhaust port 67. Water passing through center delivery tube 68 is ra idly preheated to steam by escaping vapor from the boiler out exhaust port 67. This probably saturated vapor exits at the bottom of delivery tube 68 and must thereafter pass between outer wall of delivery tube 68 and inner boiler tube walls becoming very superheated. Conditions of operation depend on amount of current supplied, amount of water supplied and spring 62 tension as adjusted by stud 60, i.e., for any metal used in the molten metal bath. One way valve 65 is included to protect water delivery system against possible pressure surges in boiler.

This embodiment is aimed primarily at small shops that most probably have an electric welder on their premises. Connecting said welder to this invention would allow these people to have an inexpensive, safe system of generating high pressure steam for cleaning or heating purposes. The main advantage here of the liquid metal bath is that by storing heat from the limited supply of current to melt a high temperature bath would allow the creating of short bursts of very high-pressure steam not normally attainable in a direct resistance heated boiler with such a low current supply.

At the other extreme this same design can be further adjusted to heat large circulating volumes of liquids to points below their boiling point. Very low melting point metals of alloys would then be used as the liquid metal bath.

The boiler of the present invention functions through the injection of water against the inside of a closed container submerged in a liquid metal bath. Temperature and pressure of steam is directly related to temperature of liquid metal and amount of water supplied. The liquid metal bath thus provides numerous advantages.

According to the present invention, extremely high steam pressures may be created, e.g., through the use of electrical energy. Since boilers must by necessity absorb different loads rapidly for specific and varying times, this would tend to create large surges of energy during actual operation. Such surges at the high power rating intended to be used becomes very difficult to control. One method would be the use of electronic switching equipment and large capacitor banks, similar for instance, to the operations of induction furnaces, which must also control this kind of current surge situation.

The present invention solves the problem by using a large heat capacitor. The heat capacitor being in the liquid metal bath. When in operation the metal in the bath is liquified by heat generated due to resistance to a large electric current flowing from boiler tube or tubes to liquid metal bath container. After the metal is melted further, resistance heating occurs and the metal bath can rise in temperature to its boiling point. However, there would be no need to reach this boiling point. For example, pure aluminum melts at 1220.4° F. and boils at 3740° F. The 1967 ASME tables list 1000° F. as the temperature required to boil 1 lb. of water to 5500 P.S.I.A. and 0.1152 cu. ft. It also requires 1344.3 BTU to do this. Aluminum has a latent heat of fusion of 170 BTU per pound. Theoretically 7.9 lbs. of aluminum cooling from liquid state to solid state would supply the energy required.

The present invention utilizes this fact of nature to invest large amounts of heat energy about this pulsating boiler without letting temperature rise to burn out the boiler tube. Current is applied to the metal bath and invested at a preset constant rate. When water is injected into the boiler tube a situation of instability is created. Equilibrium is reached when the water has absorbed enough heat to reach the temperature of its immediate surrounding environment. In this theoretical example this would be 1220.4° F. This would create water vapor of extremely high pressure. Further embodiments of this invention releases this pressure extremely rapidly creating a large sonic boom ideally suited for seismic prospecting.

By using alloys of aluminum or sodium or any other metallic substance, steam pressure operating levels can be raised or lowered at will. Also boiler tube configuration can be changed to effect different results. Again, by regulation of the charges of water injected, further regulation occurs. Such regulation may be used for lower pressures to create steam bubbles in the ocean depths for large powerful implosion sonic booms as again is ideally suited for seismic research. Further by using another attachment for this invention the boiler becomes a single pass high pressure unit capable of emitting steam continuously at variable pressure according to prior adjustment of unit. Variable pressure meaning anywhere from boiling to over 5000 P.S.I.A.

Let it be understood, however, that sonic booms for seismic prospecting must usually occur every 6 to 10 seconds consecutively for periods such as 72 hours nonstop. Thus the previous description of steam pulses may occur repeatedly every 6 to 10 seconds.

Therefore, an advantage of this invention is that it introduces a tool for seismic research capable of serving the function of previous vapor guns without the limitations of depth on steam delivery.

A further advantage of this invention is that it furnishes a tool of seismic exploration capable of exhausting extremely high-pressure steam directly into a water medium.

Another advantage of this invention is that it supplies a means of performing both of the previous functions at a much lower cost factor and with a much greater simplicity of opertion, using components such as deisel powered generators and desalination units. These components are simpler and more reliable to operate on extended ocean voyages than 3 stage compressors, for example.

A further advantage of this invention is that it supplies a mechanism being easily variable by remote control so that any frequency or intensity sound wave can be created without having to bring said vapor gun out of the ocean.

Another advantage of this invention is that it provides a compact tool to supply portable high pressure steam for such other purposes as steam cleaning, steam sterilization and steam heating.

Also, this invention is capable of operating at pressures far in excess of that which the vapor bubble system requires. The reason for this built-in additional variable is because steam injected into water directly at say 5000 P.S.I.A. causes a very strong shock wave. Since steam condenses at a very rapid rate it is possible to reverse the implosion system. This means the first shock of expanding steam at very high pressure would create said sonic shock wave. The escaping steam would be discouraged from forming any bubble of consequence by arranging the exhaust porting in such a way that condensation would occur at a faster rate than bubble growth thereby creating a shock wave without the disadvantage of the bubble effect.

While certain representative embodiments and details have been shown for the purpose of illustrating the invention, it will be apparent to those skilled in the art that various changes and modifications may be made therein without departing from the spirit or scope of the invention. It will further be understood that the invention may comprise, consist essentially of or consist of the steps or materials recited herein. Moreover, the disclosure of Canadian Patent No. 1,065,465 is incorporated herein by reference.

What is claimed is:

1. A boiler comprising:
   (a) a housing, a boiler tube in said housing, a mass of meltable metal in said housing surrounding said boiler tube and being in heat exchange relationship therewith;
   (b) means for providing an electric current through said metal capable of melting said metal by heat generated by the resistance of said metal to said electric current;
   (c) means for injecting water into said boiler tube, whereby said water is heated to the melting point temperature of said metal and said metal is at least partially solidified thereby releasing heat in an amount associated with the heat of fusion of said metal which is transferred to said water to generate steam; and
   (d) means for releasing steam generated in said boiler; and wherein said means for injecting water into said boiler tube and for releasing steam generated in said boiler are comprised of valve means including:
      (1) a valve body defining a water inlet port, a steam exit port and a valve stem chamber in communication with said water inlet and steam exit ports;
      (2) an elongated valve stem including means defining an axial passageway which terminates at a distal end of said valve stem, means defining an access port in communication with said passageway, and means defining an exterior surface which reduces the cross-sectional diameter of a portion of said valve stem; said valve stem being mounted in said valve stem chamber such that said valve stem distal end extends from said valve body, said valve stem being movable in said valve stem chamber between (i) a first position, wherein said access port establishes fluid communication between said water inlet port and said passageway, and (ii) a second position, wherein fluid communication is established between said passageway and said steam exit port by virtue of the reduced cross-sectional diameter of said valve stem portion;
      (3) means to rigidly mount said valve body to said boiler tube such that said distal end of said valve stem extends into said boiler tube; and
      (4) control means coupled to said valve stem for controlling movement of said valve stem between said first and second positions, said control means including means for exerting a bias force on said valve stem to bias said valve stem into said first position to cause said water to flow into said boiler tube through said valve stem passageway thereby generating steam in said boiler tube and for permitting said valve stem to move into said second position in response to pressure of said generated steam exceeding said bias force to thereby permit ejection of said steam from said boiler tube through said steam exit port.

2. A fluid heater comprising:
   means defining a first cavity;
   means defining a second cavity concentrically surrounding said first cavity;
   said first cavity including valve means to control the entrance of a cold fluid therein and to control the escape of heated fluid therefrom;
   said second cavity being filled with a material capable of absorbing and dissipating its latent heat of fusiuon essentially isothermally during the change of state of the material;
   means to apply heat to the second cavity to allow the material in the second cavity to reach and surpass the temperature required for its physical change of state; wherein the heat stored in the second cavity material's latent heat of fusion is always greater than the amount of heat required for the fluid of the first cavity to stabilize its rise in temperature and reach equilibrium at about the constant temperature value of the second cavity material at its change of state point temperature, the second cavity material thus serving as an isothermal heat reservoir and thereby heating the fluid of the first cavity to a stable, well-defined maximum temperature; and wherein said valve means includes:
      (1) a valve body defining a fluid inlet port, a fluid exit port and a valve stem chamber in communication with said fluid inlet and fluid exit ports;
      (2) an elongated valve stem including means defining an axial passageway which terminates at a distal end of said valve stem, means defining an access port in communication with said passageway, and means defining an exterior surface which reduces the cross-sectional diameter of a portion of said valve stem; said valve stem being mounted in said valve stem chamber such that said valve stem extends from said valve body, said valve stem being movable in said valve stem chamber between a first position ( wherein said access port establishes fluid communication between said fluid inlet port and said passageway) and a second position (wherein fluid communication is established between said passageway and said fluid exit port by virtue of the reduced cross-sectional diameter of said valve stem portion);
      (3) means to rigidly mount said valve body to said first cavity defining means such that said distal end of said valve stem extends into said first cavity; and
      (4) control means coupled to said valve stem for controlling movement of said valve stem between said first and second positions, said control means including means for exerting a bias force on said valve stem to bias said valve stem into said first position to cause said cold fluid to flow into said boiler tube through said valve stem passageway thereby generating vapor in said first cavity and for permitting said valve stem to move into said second position in response to pressure of said generated vapor exceeding said bias force to thereby permit ejection of said vapor from said first cavity through said fluid exit port.

3. A heater according to claim 2 wherein said control means includes means to repeatedly move said valve stem between said first and second positions to establish a variable pulsating rhythm according to timed injection and release of the first cavity fluid, said control means for causing the fluid in the first cavity to reside in said first cavity until a desired amount of heat is absorbed by the fluid and for releasing said heated fluid through said fluid exit port, and wherein further heat is available in the second cavity material such that release of said further available heat is needed before a true full completion of and second cavity material change of state can occur.

4. A fluid heater as in claim 2 wherein the latent heat of fusion of the second cavity material stabilizes the operating temperature of a continuous heating operation.

5. A fluid heater as in claim 2, wherein said means to supply heat to the second cavity material includes electrical resistance means to supply electrical current through the second cavity material and to release heat due to the electrical resistance of said electrical resistance means to thereby heat the second cavity material.

6. A fluid heater as claimed in claim 2, wherein said electrical resistance means is provided by the electrical resistance of said first and second cavity defining means such that upon an electrical current being passed through said first and second cavity defining means, heat is suppled to the second cavity material.

7. An apparatus to vaporize liquid comprising means defining a first cavity; means, concentrically surround said first cavity, defining a second cavity, said second cavity being substantially filled with a meltable metal; heater means for heating and thus melting said metal; and valve means rigidly mounted to said first cavity defining means for (i) injecting liquid into said first cavity so that said liquid is heated to the melting point of said heated metal, said heated metal thereby at least partially solidifying to generate heat in an amount associated with the heat of fusion of said metal, which heat of fusion is transferred to said liquid in said first cavity to thereby vaporize said liquid, and for (ii) permitting the ejection of said vaporized liquid, said valve means including:

(1) a valve body defining a liquid inlet port, a vapor exit port and a valve stem chamber in communication with said liquid inlet and vapor exit ports;

(2) an elongated valve stem including means defining an axial passageway which terminates at a distal end of said valve stem, means defining an access port in communication with said passageway, and means defining an exterior surface which reduces the cross-sectional diameter of a portion of said valve stem; said valve stem having said distal end extended into said first cavity and being mounted in said valve stem chamber to move therein between a first position (wherein said access port establishes fluid communication between said liquid inlet port and said passageway) and a second position (wherein fluid communication is established between said passageway and said vapor exit port by virtue of the reduced cross-sectional diameter of said valve stem portion);

(3) control means coupled to said valve stem for controlling movement of said valve stem between said first and second positions, said control means including means for exerting a bias force on said valve stem to bias said valve stem into said first position to cause said liquid to flow into said first cavity through said valve stem passageway thereby generating vapor in said first cavity and for permitting said valve stem to move into said second position in response to pressure of said generated vapor exceeding said bias force to thereby permit ejection of said vapor from said boiler tube through said vapor exit port.

8. An apparatus as in claim 7 wherein said control means further includes means to periodically and repeatedly move said valve stem between said first and second positions thereby causing periodic ejection of vapor from said exit port.

9. An apparatus as in claim 8 wherein said means to periodically and repeatedly move said valve stem includes:

first and second linkage means pivotally connected to one another at one end of each to establish a middle pivot point, said first linkage means at the other end thereof being pivotally connected to a proximal end of said valve stem to establish a first pivot point, and said second linkage means being pivotally connected to said valve body to establish a second pivot point, and wherein said first, middle and second pivot points are in substantial alignment when said valve stem is in said first position;

displacement means periodically operable upon said middle pivot point for displacing said pivot point out of said alignment with said first and second pivot points;

said linkage means for withstanding the pressure of said generated vapor during alignment of said first, middle and second pivot points and yet permitting said valve stem to be moved to said second position under influence of said pressure in response to said middle pivot point being displaced out of alignment with said first and second pivot points by virtue of said displacement means.

10. An apparatus as in claim 9 wherein said biasing means includes spring means connected between said middle pivot point and said valve body for returning said middle point into alignment with said first and second pivot points in response to release of said generated vapor through said exit port.

11. An apparatus as in claim 9 wherein said displacement means includes an electrically excitable solenoid valve having a moveable actuator disposed in operative association with said middle pivot point, said actuator moving to displace said middle pivot point in response to excitation of said solenoid valve.

12. An apparatus as in claim 7 said valve means further includes means to permit the continuous generation of vapor, said continuous vapor generation means including:

means defining an elongated annular passageway to establish constant communication between said liquid inlet port and said axial passageway when said valve stem is moved to either said first or second positions, wherein said valve stem blocks said vapor exit port when in said first position while yet permitting fluid to be introduced into said first cavity due to said elongated annular passageway;

said control means for maintaining said valve stem in said first position until sufficient pressure has been established in said first cavity due to the generation of said vapor and, thereafter, permitting said valve stem to move to said second position under influence of said sufficient pressure to thereby establish a continuous path of fluid communication between said liquid inlet and vapor exit ports.

13. An apparatus as in claim 12 said liquid inlet port includes one-way valve means to permit said liquid to flow only in a direction into said first cavity.

14. An apparatus as in claim 12 wherein said biasing means includes adjustment means to adjust the bias force exerted upon said valve stem to establish the amount of said sufficient pressure.

15. A valve for use in an apparatus to vaporize liquid of the type comprising means defining a first cavity; means, concentrically surrounding said first cavity, defining a second cavity, said second cavity being substantially filled with a meltable metal; and heater means for heating and thus melting said metal; said valve comprising valve means rigidly mountable to the first cavity defining means for (i) injecting liquid into the first cavity so that the injected liquid is heated to the melting point of the heated metal, the heated metal thereby at least partially solidifying to generate heat in an amount associated with the heat of fusion of the metal, which heat of fusion is transferred to the injected liquid in the first cavity to thereby vaporize the liquid, and for (ii) permitting the ejection of the vaporized liquid, said valve means including:

(1) a valve body defining a liquid inlet port, a vapor exit port and a valve stem chamber in communication with said liquid inlet and vapor exit ports;

(2) an elongated valve stem including means defining an axial passageway which terminates at a distal end of said valve stem, means defining an access port in communication with said passageway, and means defining an exterior surface which reduces the cross-sectional diameter of a portion of said valve stem; said valve stem having said distal end extended exteriorly of said valve body so as to be insertable into said first cavity and being mounted in said valve stem chamber to move therein between a first position (wherein said access port establishes fluid communication between said liquid inlet port and said passageway) and a second position (wherein fluid communication is established between said passageway and said vapor exit port by virtue of the reduced cross-sectional diameter of said valve stem portion); and (3) control means coupled to said valve stem for controlling movement of said valve stem between said first and second positions, said control means including means for exerting a bias force on said valve stem to bias said valve stem into said first position to cause said fluid to flow into said first cavity through said valve stem passageway thereby generating vapor in said first cavity and for permitting said valve stem to move into said second position in response to pressure of said generated vapor exceeding said bias force to thereby permit ejection of said vapor from said boiler tube through said vapor exit port.

16. A valve as in claim 15 wherein said control means further includes means to periodically and repeatedly move said valve stem between said first and second positions thereby causing periodic ejection of vapor from said exit port.

17. A valve as in claim 16 wherein said means to periodically and repeatedly move said valve stem includes:

first and second linkage means pivotally connected to one another at one end of each to establish a middle pivot point, said first linkage means at the other end thereof being pivotally connected to a proximal end of said valve stem to establish a first pivot point, and said second linkage means being pivotally connected to said valve body to establish a second pivot point, and wherein said first, middle and second pivot points are in substantial alignment when said valve stem is in said first position;

displacement means periodically operable upon said middle pivot point for displacing said pivot point out of said alignment with said first and second pivot points;

said linkage means for withstanding the pressure of said generated vapor during alignment of said first, middle and second pivot points and yet permitting said valve stem to be moved to said second position under influence of said pressure in response to said middle pivot point being displaced out of alignment with said first and second pivot points by virtue of said displacement means.

18. A valve as in claim 17 wherein said biasing means includes spring means connected between said middle pivot point and said valve body for returning said middle point into alignment with said first and second pivot points in response to release of said generated vapor through said exit port.

19. A valve as in claim 17 wherein said displacement means includes an electrically excitable solenoid valve having a moveable actuator disposed in operative association with said middle pivot point, said actuator moving to displace said middle pivot point in response to excitation of said solenoid valve.

20. A valve as in claim 15 wherein said valve means further includes means to permit the continuous generation of vapor, said continuous vapor generation means including:

means defining an elongated annular passageway to establish constant communication between said liquid inlet port and said axial passageway when said valve stem is moved to either said first or second positions, wherein said valve stem blocks said vapor exit port when in said first position while yet permitting fluid to be introduced into said first cavity due to said elongated annular passageway;

said control means for maintaining said valve stem in said first position until sufficient pressure has been established in said first cavity due to the generation of said vapor and, thereafter, permitting said valve stem to move to said second position under influence of said sufficient pressure to thereby establish a continuous path of fluid communication between said liquid inlet and vapor exit ports.

21. A valve as in claim 20 wherein said liquid inlet port includes one-way valve means to permit said liquid to flow only in a direction into said first cavity.

22. A valve as in claim 20 wherein said biasing means includes adjustment means to adjust the bias force exerted upon said valve stem to establish the amount of said sufficient pressure.

* * * * *